(No Model.)
W. W. SNOW.
CAR WHEEL.
No. 361,332. Patented Apr. 19, 1887.
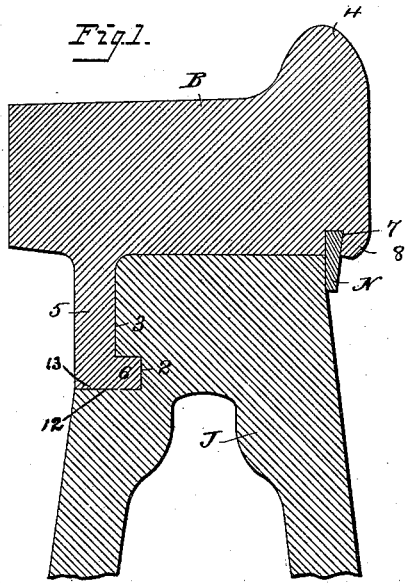
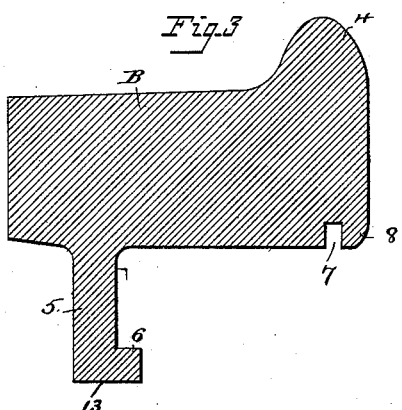
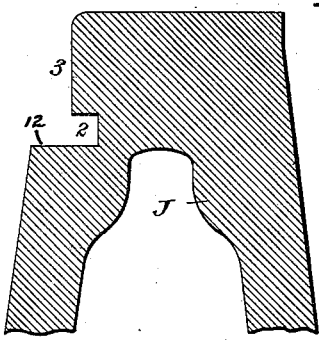
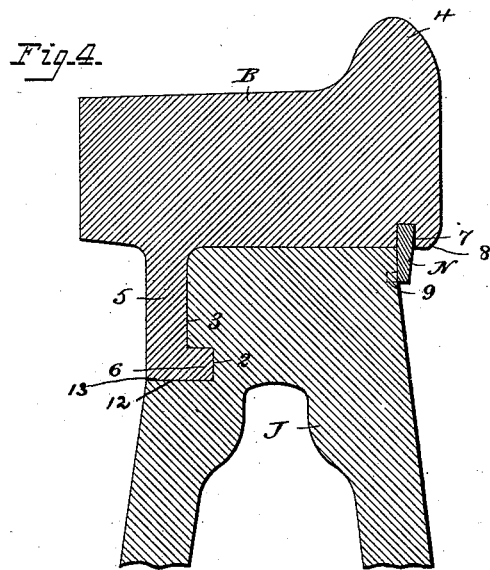
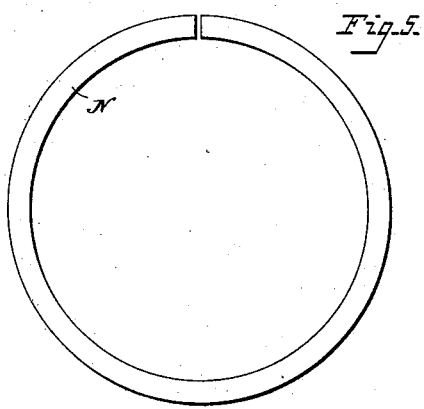
Attest:
Court. A. Cooper
A. E. F. Hansmann.
Wm. W. Snow,
Inventor
By Foster & Freeman
Attys.

UNITED STATES PATENT OFFICE.

WILLIAM W. SNOW, OF RAMAPO, NEW YORK.

CAR-WHEEL.

SPECIFICATION forming part of Letters Patent No. 361,332, dated April 19, 1887.

Application filed December 29, 1886. Serial No. 222,895. (No model.)

*To all whom it may concern:*

Be it known that I, WILLIAM W. SNOW, a citizen of the United States, residing at Ramapo, Rockland county, New York, have invented certain new and useful Improvements in Car-Wheels, of which the following is a specification.

My invention relates to that class of car-wheels in which the tires are locked to the body portions; and my invention consists of a recessed body combined with a tire having a flange fitting the recess of the body and a ring locking the tire and body laterally together, as fully set forth hereinafter, and shown in the accompanying drawings, in which—

Figure 1 is a transverse section of my improved car-wheel. Fig. 2 is a section of the body. Fig. 3 is a section of the tire; Fig. 4, a section showing the parts in position for being secured together; Fig. 5, a side view of the locking-ring.

The body J of the wheel is of any usual or suitable construction, either in one piece or built up of separate parts, it only being essential that it be formed or cut away at one side, near its periphery, to produce a continuous annular rabbet or depression, 3, provided at one side, near its base, with an annular groove, 2, for a purpose presently to be explained.

The tire B, of suitable width, has in most instances the usual flange, 4, and at or near the opposite edge extends inwardly an annular flange, 5, adapted to fit the rabbet or depression 3 of the body, and having at one side a lip, 6, adapted to the groove 2, all the parts being constructed so that the tire-faces will fit nicely to the faces of the body, as shown in Fig. 1. In this tire as formed is an annular groove, 7, of uniform width, so situated that when the tire is placed upon the body the inner face of the groove will be flush with the adjacent face of the wheel.

In order to lock the tire effectually to the body, I use a split locking-ring, N, which is thicker at the outer than at the inner edge, the thicker portion being adapted to fit the recess or groove 7, into which the ring may be sprung, so as to occupy the position shown in Fig. 4. After the locking-ring is thus adjusted, the annular lip 8, outside of the groove 7, is hammered or otherwise forced down upon the ring N to the position shown in Fig. 1. When the tire is shrunken on the body, it is sufficiently heated to permit the lip 8 to be readily hammered down into position.

The strains resulting from the lateral thrust of the flange 4 against the rails are resisted by the flange 5, which bears firmly against the side of the rim, there being but little lateral strain in the opposite direction; but such strains are resisted by the ring N, which effectually holds the tire in place.

Should the tire break transversely, the locking lip or flange 6 still holds it securely to the body of the wheel, while the wedge form of the ring N effectually prevents the ring from being displaced whether it be split in one or more places; and, if desired, the ring N may have a lip, 9, fitting a groove in the side of the body, as shown in dotted lines, Fig. 4, thus aiding in holding the tire to the wheel on the inner side.

By fitting the flange 5 snugly in the rabbet or depression 3 in the body I not only bring the outer face of the flange flush with that of the body, but also secure a firm bearing or seat, 12, for the inner surface, 13, of the flange, thereby greatly adding to the stability of the structure.

I am aware that it is not new to this art to provide a car-wheel tire with an inwardly-projecting flange having a shoulder to fit a groove in the body or rim of the wheel, and held in position by a ring which extends into said tire and bears upon the rim or body of the wheel upon the side opposite that containing the groove, and I therefore do not broadly claim such construction.

Without limiting myself to the precise construction and arrangement of the parts shown, I claim—

1. The combination, in a car-wheel, of a body having an annular rabbet or depression in one of its sides, an annular groove at the base of said depression, a tire having a flange fitting said depression and provided with a lip fitting said groove, and a locking-ring at the opposite face to secure the tire to the rim, substantially as described.

2. The combination of the body of a car-wheel having at one side an annular rabbet or depression, a groove and an annular face, 12, projecting beyond the groove, a tire with a flange fitting said groove and recess and bearing on said face, and a locking-ring secured in the tire and bearing on the inner face of the body, substantially as described.

In testimony whereof I have signed my name to this specification in the presence of two subscribing witnesses.

WILLIAM W. SNOW.

Witnesses:
PETER D. JOHNSON,
H. SEYMOUR JOHNSON.